April 23, 1968     K. W. BRITTAN     3,378,919
LAMINATED TRANSPARENT PANELS INCORPORATING HEATING WIRES
Filed July 15, 1963     3 Sheets-Sheet 1
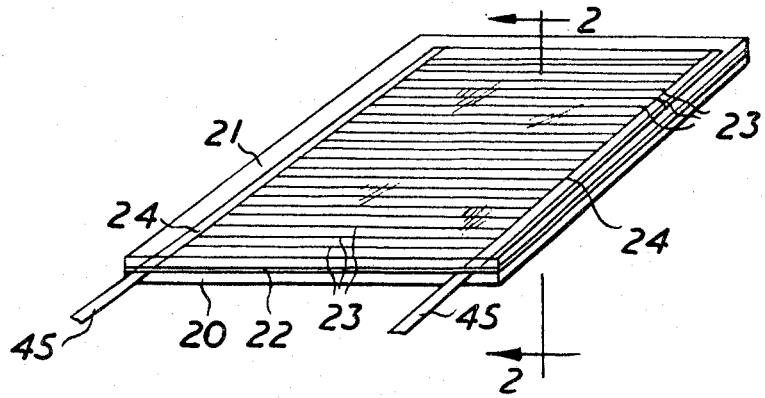
Fig-1-
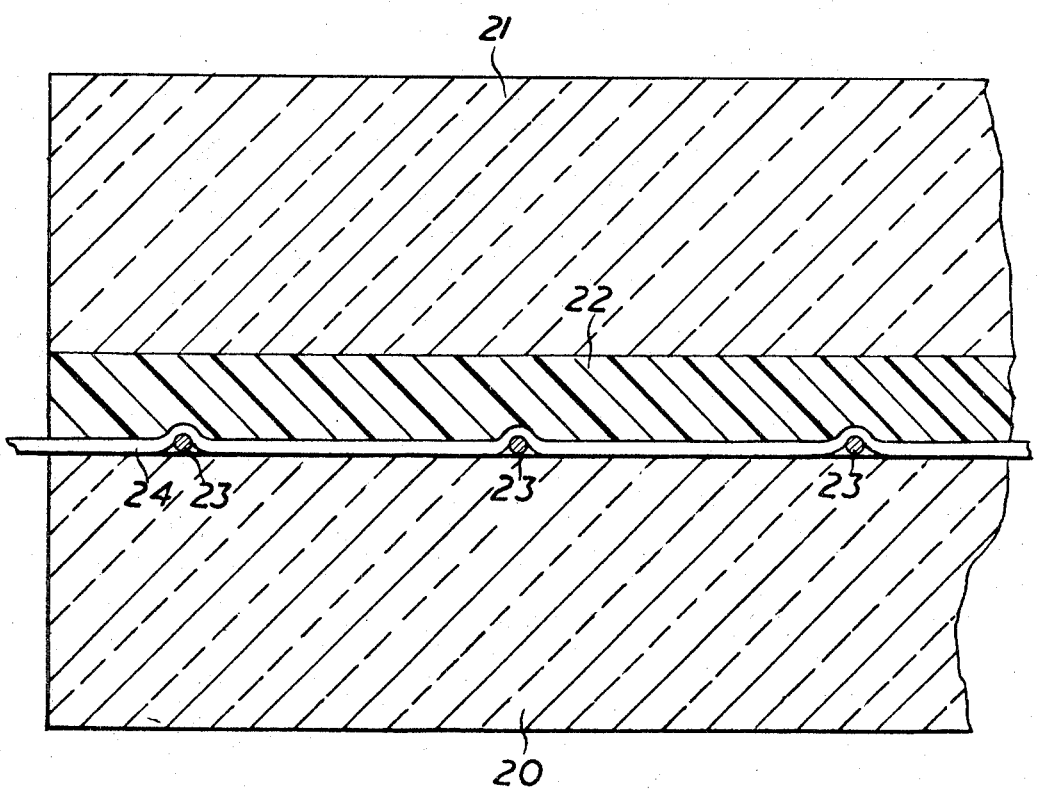
Fig-2-

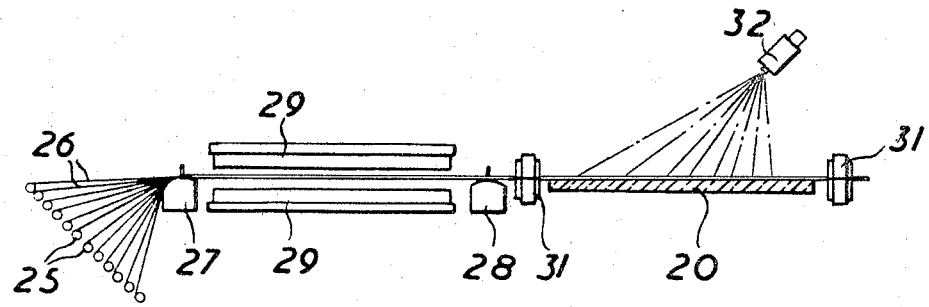
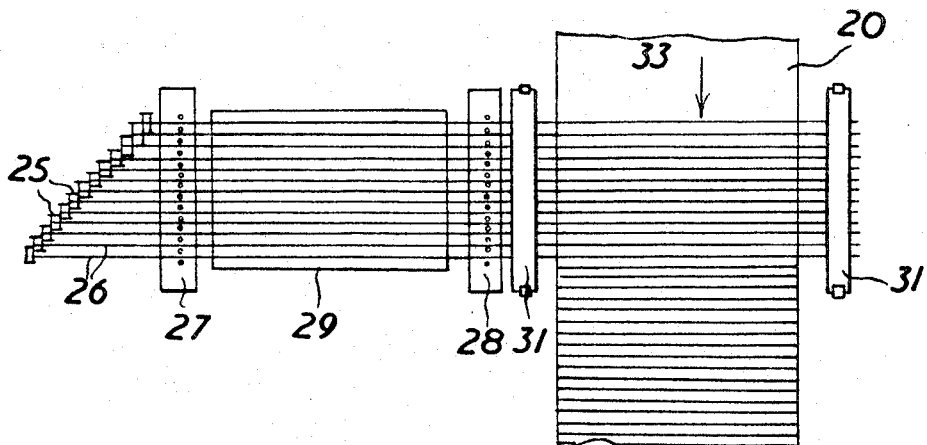
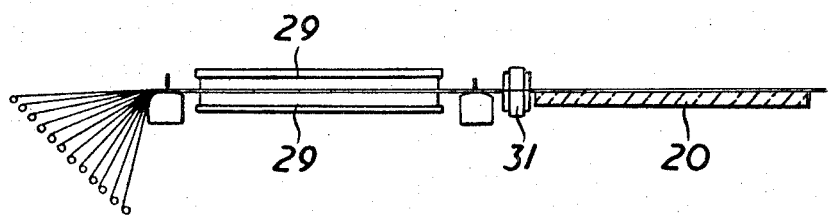

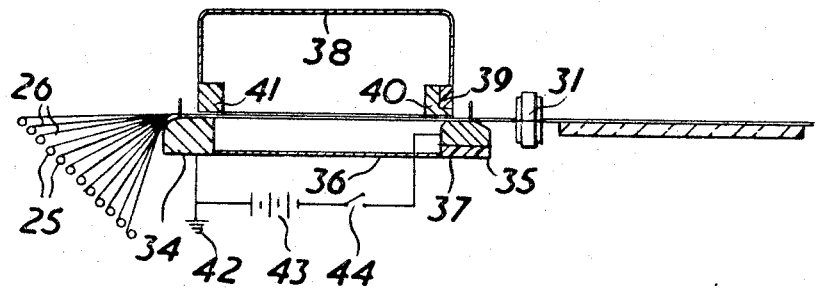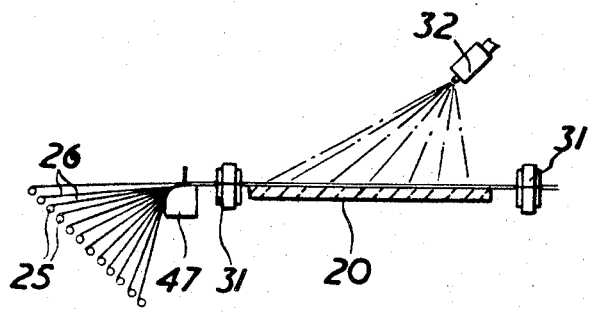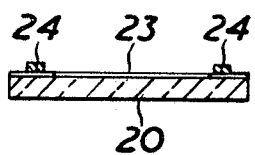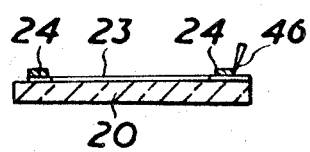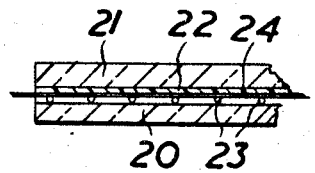

United States Patent Office 3,378,919
Patented Apr. 23, 1968

3,378,919
LAMINATED TRANSPARENT PANELS INCORPORATING HEATING WIRES
Kenneth Walter Brittan, Great Abington, near Cambridge, England, assignor to Triplex Safety Glass Company Limited, London, England, a British company
Filed July 15, 1963, Ser. No. 294,821
Claims priority, application Great Britain, July 16, 1962, 14,526/62
16 Claims. (Cl. 29—611)

This invention relates to laminated transparent panels incorporating heating wires. The invention is more particularly concerned with panels of the known kind which comprise sheets of transparent material laminated together, and a plurality of electrically conductive heating wires extending in parallel between common feed conductors, the heating wires and feed conductors lying between a pair of adjacent sheets of electrically non-conductive material forming layers of the panel. In using panels of this known kind the feed conductors are connected to a suitable source of electricity and an electric current passes through the wires causing the panel to be heated.

Panels of this kind usually comprise laminated glass sheets with intermediate sheets or interlayers of synthetic resinous materials, but they may well comprise laminated sheets of other transparent materials such as that material sold under the registered trademark "Perspex."

Laminated glass panels of the kind specified have been made by fixing a pair of mutually spaced feed conductors or busbars to a glass sheet, which is to form the base of the panel, laying groups of mutually spaced parallel wires across the busbars and securing them in position, applying a sheet of interlayer material and a top glass sheet, and bonding these components together. The wires are usually less than 0.002" in diameter and each may be spaced from the next by a gap of 0.05".

In one method previously employed each busbar is formed by sandblasting part of the surface of the glass base sheet through a mask and then spraying tin or other suitable metal onto this part through the same mask. After the wires have been laid across the busbars solder is flowed around them to secure them to the busbars. In another method previously employed each busbar comprises a first tinned copper strip cemented to the glass base sheet and underlying the wires, and a second tinned copper strip overlying the wires, a soldering iron being rubbed over the second strip to melt the solder. In a typical construction each strip is about ⅛" wide and, for convenience in handling, is about 0.005" thick. In carrying out each of these methods each group of wires is temporarily held in position after being laid by spraying it with a weak solution of the interlayer material in a volatile solvent, that material covering those parts of the wires connected to the busbars being dispersed by the heat subsequently applied during soldering.

Both of the methods previously employed suffered from the disadvantage that the electrical connection between the wires and the feed conductors or busbars was often poor. An object of the present invention is to provide a construction in which the connection is more reliable.

Other objects and advantages of the invention will become apparent as the description proceeds.

According to one aspect of the present invention there is provided a laminated transparent panel comprising sheets of transparent material laminated together, the panel incorporating means whereby it can be heated which means comprises a plurality of electrically conductive heating wires extending in parallel between common feed conductors, each wire being not more than 0.003" thick and each feed conductor comprising a metallic strip not more than 0.003" thick, the means lying between a pair of adjacent sheets of electrically non-conductive material, one sheet of said pair of sheets presenting an even face against which the wires and feed conductor strips lie, each strip arching away from said face where it passes over and contacts each wire, and the adjacent face of the other sheet of said pair being formed with recesses which receive the wires and the feed conductor strips.

An additional advantage arises from the fact that the feed conductors in panels made in accordance with the invention may be thinner than those previously employed. The previous feed conductors were usually of a thickness comparable with that of the interlayer, such an interlayer being about 0.015" thick. As a result difficulty was experienced during lamination in extracting all the air from between the sheets on each side of the conductors, and undesirable pockets of air were often left in the completed panels. The formation of such air pockets can be avoided or at least much reduced in panels made in accordance with the present invention, by the use of the relatively thin feed conductors.

As each strip forms an arch over each wire the area of contact between the strip and the wire can be greater than between the comparable components in the panels of the kind employed previously.

According to another aspect of the present invention there is provided a method of making a laminated transparent panel incorporating heating means whereby it can be heated, which comprises the steps of placing a plurality of mutually spaced, electrically conductive, heating wires on an even face of a sheet of transparent, electrically non-conductive material which is to form a layer of the panel, each wire being not more than 0.003" thick, placing a pair of spaced, metallic strips across the wires, each strip being no more than 0.003" thick, and deforming each strip so that it forms an arch over each wire, the arrangement being such that in the completed panel the wires and strips are received in recesses in another transparent, electrically non-conductive sheet forming an adjacent layer of the panel and the wires are in electrical contact with the strips and extend between the strips which can thus act as feed conductors.

According to another aspect of the present invention there is provided a laminated transparent panel made by the method set forth in the last preceding paragraph.

The invention will now be more particularly described with reference to the accompanying drawings in which:

FIGURE 1 is a perspective view of a laminated transparent panel in accordance with the invention, FIGURE 2 is a section, to an enlarged scale, along the line 2—2 of FIGURE 1, FIGURE 3 is a diagrammatic side view of apparatus used in carrying out one method in accordance with the invention, FIGURE 4 is a diagrammatic plan view of the apparatus shown in FIGURE 3, FIGURE 5 is similar to FIGURE 3 but shows the parts in another position, FIGURE 6 is a diagrammatic side view of apparatus used in carrying out another method in accordance with the invention, FIGURE 7 is a diagrammatic side view of apparatus used in carrying out yet another method in accordance with the invention, FIGURES 8 and 9 are diagrammatic sections through partly completed panels in the manufacture of a panel in accordance with the invention, and FIGURE 10 is a diagrammatic section through a partly completed panel, at right angles to the section of FIG- URES 8 and 9, and illustrating a later stage in the manufacture of the panel.

The laminated transparent panel shown in FIGURES 1 and 2 comprises three sheets of transparent material laminated together and also means whereby the panel can be heated. The panel may be used as a back light in a motor vehicle. The outer layers of the panel comprise glass sheets 20 and 21 and an intermediate sheet 22 of an interlayer material of known kind. The interlayer material may be a vinyl-butyl aldehyde resin. The glass sheets are thus relatively hard as compared with the intermediate sheet which is relatively yielding. A plurality of mutually parallel electrically conductive heating wires 23 extend between a pair of common feed conductors 24 so that they are electrically in parallel. Each wire is not more than 0.003" thick and each feed conductor, which comprises a strip of soft, ductile copper, is also not more than 0.003" thick. As can be seen from FIGURE 2 the wires lie against the flat, even face of the lower glass sheet 20 and the feed conductor strips 24 also lie against this face except where they arch away from the face where they pass over the wires and contact the wires. The overlying sheet 22 of the interlayer material is formed with recesses which receive the wires 23 and the feed conductor strips 24. As explained below the recesses are formed by the wires and feed conductors being forced into the surface of the relatively yielding material when the sheets are to be laminated together.

One method of making a panel of the kind illustrated in FIGURES 1 and 2 will now be described with reference to FIGURES 3, 4 and 5. The apparatus illustrated in these figures comprises a set of reels of wire 25 from which the heating wires 26 can be drawn, two comb-like structures 27 and 28 with a pair of felt pads 29 mounted between them. Beyond the comb-like structure 28 lies the sheet of glass 20 onto which the wires are to be laid. There is also a pair of clamping devices 31, each comprising a pair of bars which can be releasably clamped to the wires and can be from one side of the glass to the other.

Hitherto it has been customary to form the heating wires of a nickel and chromium alloy. The wires are by nature shiny with the result that in use, at night, when a source of light is viewed through a panel incorporating such wires, light is reflected from each wire and a broken line of light appears to extend across the panel. To reduce this disturbing effect it has been the practice to oxidise the surface of the heating wires before they are incorporated in the panel so that the surface has a dark and preferably matt surface. The disadvantage of this practice is that the electrical contact between the oxidised surfaces of the wires and the feed conductor strips is poor and uncertain so that in use the panel may be heated in a non-uniform manner.

In order to overcome or reduce this difficulty we may incorporate cupro-nickel heating wires of which the reflectivity has been reduced over at least part of the area between the feed conductor strips, but which have clean metallic surfaces connected with the feed conductor strips.

Cupro-nickel wires have several advantages. Firstly, the specific resistance of a cupro-nickel heating wire is less than that of one made from an alloy of chromium and nickel, so that thinner heating wires can be used than those previously employed. Secondly, cupro-nickel heating wires are more readily attacked by solder than are the wires previously employed, so that an improved electrical conection between the wires and the feed conductors may be obtained when they are used. Thirdly, cupro-nickel wires are readily rendered dull and non-reflective as, for example, by treating them with ammonium sulphide to produce a dark coating of copper sulphide, or by heating them in air or in some other gaseous medium to oxidise or otherwise to reduce the reflectivity of their surfaces.

In practice there may be forty reels 25 of cupro-nickel wire, fewer being shown in the interests of clarity. Each wire may conveniently be of 0.0016" diameter. The wires are drawn simultaneously through the first comb-like structure 27 so that they form a horizontal flat band 2" wide of evenly spaced parallel wires. The wires also pass through the second comb-like structure 28, which is spaced from the first such structure 27 by a distance rather greater than the length of the heating wires in the completed panel, and are gripped by a releasably clamping device 31 immediately beyond the second comb-like structure 28. The felt pads 29 between the comb-like structures are wetted with ammonium sulphide and are momentarily pressed together onto the band, as shown in FIGURE 5, causing a dark, non-reflective, coating of copper sulphide to be formed on the wires. The length of the pads 29 is such that the length of the wires coated in this way is slightly less than the distance between the feed conductor strips in the completed panel. After the pads have been separated to release the wires, the wire clamping device adacent to the second-comb like structure 28 is moved away from this structure drawing the band of wires with it over the top surface of the glass sheet 20 until the coated part of the band lies on the central part of the sheet. A second clamping device is caused to grip the band immediately beyond the second comb-like structure 28 so that the part of the band overlying the glass sheet is maintained tight and in contact with the sheet by the two clamping devices. That part of the band overlying the glass sheet is sprayed with a dilute solution of the interlayer material in a volatile solvent. For example, if the interlayer material is a vinyl-butyl aldehyde resin the band may be sprayed with a dilute solution of this resin in chloroform. The spraying operation is indicated diagrammatically in FIGURE 3 where there is shown the head of a spray-gun 32. After the spraying operation the band is severed along the edges of the glass sheet 20. The glass sheet with the wires mounted on it is shifted a distance equal to the width of the band in the direction of the arrow 33. The process is then repeated until the desired area of the base sheet has been overlaid with wires.

An alternative method of reducing the reflectivity of those parts of the wires which, in the completed panel, lie between the feed conductor strips is illustrated in FIGURE 6. The apparatus used in carrying out this method replaces the comb-like structures 27 and 28, and the felt pads 29. The comb-like structures 27 and 28 are replaced by similar structures 34 and 35 respectively. The base of each structure is of metal, and the structures form part of the tray-shaped lower portion 36 of a container. The structure 35 is electrically insulated from the remainder of the lower portion of the container by electrically non-conductive material 37. The upper portion 38 of the container is of box-like shape and is open on its underside. It is largely made of metal but includes a non-conductive part 39 which serves to insulate a metal bar 40, adjacent to the structure 35, from the remainder of the upper portion of the container. The upper portion 38 also includes a metal bar 41 adjacent to the structure 34. In use the structure 34 is earthed, as indicated at 42, and the structure 35 can be connected to a source of electrical potential, as for example a battery 43, by way of a switch 44. The upper portion 38 of the container is lowered onto the lower portion 36, so that the container is closed, and the band of wires is gripped at one end between the parts 34 and 41, and at the other end between the parts 35 and 40. The switch 44 is closed and an electric current is passed through the wires to heat the wires and allow their surfaces to become oxidised from the surrounding gaseous medium, which contains oxygen and may conveniently comprise air. A current of 20 amperes for 5 seconds is found sufficient for a band of the dimensions given above. The length of the band thus heated is of course determined by the distance between the opposite ends of the container, and the arrangement is such that the length is slightly less than the distance between the feed conductors in the finished panel.

After the wires 23 have been laid on the glass sheet 20 the feed conductor strips 24 are applied. Each strip comprises a tinned strip of soft, ductile copper 0.002" thick and 1/8" wide. Each strip is laid across the wires, one strip overlying the untreated parts of the wires at each end of the parts of reduced reflectivity. The strips are then brushed over with some of the solvent for the interlayer material. The solvent flows round and under the busbar and disperses the thin film of interlayer material which would otherwise separate the strips from the wires. If desired a heated soldering iron may be passed along the strips to ensure total dispersal of the film and to solder the strips to the wires. The soldering iron at least partially deforms the strips so that they lie against the surface of the glass sheet and arch away from the sheet over the wires. One end of each strip may extend beyond the edge of the base sheet to provide a connecting tag 45, as shown in FIGURE 1. The arrangement of the parts at this stage is illustrated diagrammatically in FIGURE 8.

As shown diagrammatically in FIGURE 9 the wires are trimmed off to the outer edges of the strips 24 with a cutting tool 46. The sheet 22 of interlayer material is placed over the glass sheet 20 and the heating wires 23 and feed conductor strips 24. The upper sheet of glass 21 is placed on top of the interlayer sheet and the components are then as illustrated diagrammatically in FIGURE 10.

The components are next given a preliminary bonding treatment before being finally bonded in an autoclave under the influence of heat and pressure. These treatments are of known kind and form no part of the present invention. During the lamination process the sheets are pressed together, and the interlayer sheet becomes formed with recesses which receive the heating wires and feed conductor strips. At the same time the interlayer sheet presses on the feed conductor strips and, if they have not been deformed or have been only partially deformed by treatment with the soldering iron as described above, deforms the strips so that between the wires they lie against the sheet 20 and adjacent to the wires they arch away from the sheet 20 and pass over the wires. Each strip is thus forced into tight engagement with each wire over an extended area. The strip may stretch slightly when being deformed.

The initial bonding may be effected in known manner by inserting the marginal parts of the assembled components into a rubber element of channel-like shape, leaving a space between the edges of the components and the base of the channel-like element, and extracting the air from the space, and consequently from between the components, while the assembly is heated.

If desired the edge of the sheet of glass 21 may be formed with a notch above the extended end of each strip 24 so that a connection to a suitable external feed wire can be made within the confines of the panel.

In use the potential applied to the feed conductor strips may be such that the heating wires dissipate 40 watts per square foot of panel to be heated electrically.

In an alternative method in accordance with the present invention the heating wires are made of tungsten rather than of cupro-nickel. The wires used in practice are of 0.0008" diameter. As tungsten has a lower reflectivity than cupro-nickel, and as the wires used are less thick than the cupro-nickel wires described above, the broken line of light which appears to extend across the panel when a source of light is viewed through the panel at night, is negligible, and the reflectivity of those parts of the wires extending between the feed conductor strips need not be reduced.

Apparatus for use in laying the wires on the lower glass sheet 20 is shown diagrammatically in FIGURE 7. This will not be described in detail as the only difference between this apparatus and that shown in FIGURES 3, 4 and 5 is the replacement of the two comb-like structures 27 and 28 with a single comb-like structure 47. The method of assembling the panel using this apparatus is the same as that previously described with reference to FIGURES 3, 4, 5, 8, 9 and 10, apart from the fact that the reflectivity of the wires is not reduced.

Another form of panel in accordance with the present invention is similar to that shown in FIGURES 1 and 2 but comprises only two sheets of material instead of three, these sheets being made of polymethyl methacrylate, for example that material sold under the registered trademark "Perspex." During manufacture one of the sheets is rendered relatively yielding by its being heated, and the heating wires and feed conductor strips are forced into the surface of the yielding material when the sheets are to be laminated together. In the finished panel the heating wires and feed conductor strips lie against the even surface of the other sheet.

I claim:

1. A method of making a laminated transparent panel incorporating heating means whereby it can be heated, which comprises the steps of placing a plurality of mutually spaced, electrically conductive, heating wires on an even face of a sheet of transparent, electrically non-conductive material which is to form a layer of the panel, each wire being not more than 0.003" thick, placing a pair of spaced metallic strips directly across and in electrically conductive contact with the wires, each strip being no more than 0.003" thick, and applying deforming pressure to each strip so that it forms an arch over each wire and lies against said even face of said sheet between wires, and laminating the thus assembled parts with a second transparent electrically non-conductive sheet so that in the completed panel the wires and strips are received in recesses in said second transparent, electrically non-conductive sheet forming an adjacent layer of the panel and the wires are in electrical contact with the strips and extend between the strips which can thus act as feed conductors.

2. A method according to claim 1 in which, at least during manufacturing the material of the first mentioned sheet is relatively hard and that of the second mentioned sheet is relatively yielding, and in which the recesses are formed by the heating means being forced into the surface of the yielding material when the sheets are laminated together.

3. A method according to claim 2 in which said second mentioned sheet remains relatively yielding in the completed panel and is laminated between said first mentioned sheet, and a third sheet, which like said first mentioned sheet, is of relatively hard material.

4. A method according to claim 2 in which said second mentioned sheet is rendered relatively yielding during manufacture and is subsequently treated to become and remain relatively hard in the completed panel.

5. A method according to claim 4 in which said first mentioned sheet and second mentioned sheet are both made of polymethyl methacrylate, and in which said second mentioned sheet is rendered relatively yielding during manufacture by its being heated.

6. A method according to claim 1 in which each strip comprises a strip of soft, ductile copper.

7. A method according to claim 1 in which the recessed sheet is of synthetic resinous material and in which the recesses are formed by the wires and strips as the sheet is pressed during the process of lamination, the strips being at least partially deformed at the same time by the pressing operation.

8. A method according to claim 1 in which the heating wires are made of cupro-nickel.

9. A method according to claim 7 in which the strips are soldered to the wires.

10. A method according to claim 1 and including a step of reducing the reflectivity of those parts of the wires which in the finished panel lie between the strips before the wires are placed on the sheet of transparent material.

11. A method according to claim 10 in which the wires are made of cupro-nickel and the reflectivity of the wires is reduced by treating them with ammonium sulphide.

12. A method according to claim 11 in which the wires are treated by being gripped between pads impregnated with ammonum sulphide.

13. A method according to claim 10 in which the reflectivity of the wires is reduced by oxidising the surface layers of the wires.

14. A method according to claim 13 in which the surface layers of the wires are oxidised by surrounding these parts of the wires to be oxidised with a gas comprising oxygen and heating the wires by passing an electric current through them.

15. A method according to claim 1 in which the heating wires are made of tungsten.

16. A method according to claim 15 in which the wires are substantially 0.0008" thick.

References Cited

UNITED STATES PATENTS

| | | | |
|---|---|---|---|
| 2,526,327 | 10/1950 | Carlson | 219—544 |
| 3,062,940 | 11/1962 | Bauer et al. | 219—544 |
| 2,629,166 | 2/1953 | Marsten et al. | 29—620 |
| 2,693,023 | 11/1954 | Kerridge et al. | 29—620 |
| 2,719,907 | 10/1955 | Combs | 219—544 X |
| 2,750,321 | 6/1956 | Koppelman | 156—281 X |
| 3,111,570 | 11/1963 | Strang | 219—544 X |

WILLIAM I. BROOKS, *Primary Examiner.*

ANTHONY BARTIS, JOHN F. CAMPBELL,
*Examiners.*

V. Y. MAYEWSKY, *Assistant Examiner.*